United States Patent [19]

Dargel

[11] Patent Number: 4,518,402

[45] Date of Patent: May 21, 1985

[54] REUSEABLE AIR FILTER SYSTEM

[76] Inventor: Robert L. Dargel, 5430 NE. 16th Ave., Fort Lauderdale, Fla. 33334

[21] Appl. No.: 500,319

[22] Filed: Jun. 2, 1983

Related U.S. Application Data

[63] Continuation of Ser. No. 320,161, Nov. 10, 1981, abandoned, which is a continuation of Ser. No. 114,702, Jan. 23, 1980, abandoned, which is a continuation of Ser. No. 959,007, Nov. 9, 1978, abandoned.

[51] Int. Cl.³ .......................... B03C 3/30; B01D 46/52
[52] U.S. Cl. .......................................... 55/103; 55/131; 55/485; 55/489; 55/501; 55/DIG. 31; 55/DIG. 39
[58] Field of Search ................ 55/101, 131, 485–489, 55/498–501, 528, DIG. 31, 103, DIG. 39

[56] References Cited

U.S. PATENT DOCUMENTS

| | | | |
|---|---|---|---|
| 2,612,966 | 10/1952 | Nicol | 55/528 |
| 2,804,937 | 9/1957 | Poole | 55/103 |
| 2,809,715 | 10/1957 | Lemkey | 55/DIG. 31 |
| 3,237,387 | 3/1966 | Haugen et al. | 55/103 |
| 3,563,828 | 2/1971 | Marshall | 55/528 |
| 4,115,082 | 9/1978 | Newell | 55/103 |
| 4,129,430 | 12/1978 | Snow | 55/528 |

*Primary Examiner*—David L. Lacey
*Attorney, Agent, or Firm*—Malin, Haley, McHale & Barron

[57] ABSTRACT

A reusable air filter system for providing permanent, self-charging, electrostatic filter stages that are easily cleanable for re-use. The filter system may be used on air conditioners, furnaces, and grease hoods. A frame is circumscribed about the edges of a plurality of polypropylene filter elements. At least one stage of the filter is three dimensional in shape and folded over on itself to retain its filtering characteristics and to provide a dual biasing device for use with the filter stages upstream of the three dimensional filter. The folded three dimensional filter is not creased, thus providing an additional biasing element in the filter system.

1 Claim, 6 Drawing Figures

REUSEABLE AIR FILTER SYSTEM

This is a continuation of Ser. No. 320,161, filed 11/10/81, now abandoned, which is a continuation of Ser. No. 114,702, filed 1/23/80, now abandoned, which is a continuation of Ser. No. 959,007, filed Nov. 9, 1978 and now abandoned.

BACKGROUND OF THE INVENTION

This invention relates to an air filter element system for providing new and unique filtering design including at least one three dimensional piece of filtering material folded over on itself to provide a biasing means for the filtering system. The filter system is held together in a new and improved metal or fabric frame.

In the past, various filters having layers of filter elements have been proposed but not in a practical system for everyday use in order to substantially reduce maintenance costs and the cost of throwaway filters. One such filter is shown in the U.S. Pat. No. 2,804,937. Further, this invention avoids the use of materials that deteriorate in adverse environments.

BRIEF DESCRIPTION OF THE INVENTION

A reusable air filter system for providing permanent self-charging, electrostatic filters that are cleanable for re-use. The filters may be used on air conditioners, furnaces and grease hoods. A non-corrosive synthetic flexible frame or an aluminum frame is disposed about the perimeter of a plurality of polypropylene filter elements. At least one stage of the filter is three dimensional in shape to retain the filtering characteristics and folded over on itself to provide a biasing means in conjunction with the filter elements upstream of the three dimensional filter. The folded three dimensional filter is not creased thus providing an additional biasing means in the filter system.

It is an object of this invention to provide a filtering system of three dimensional filter elements which provide a biasing means for adjacent filter elements, for maintaining predetermined positions of different stages of filter elements.

Another object of this invention is to provide a filtering system with a folded three dimensional filter element to provide an additional biasing means for the filter system for retaining the position of various stages of filter elements with respect to each other, thus maintaining the proper filtering characteristics.

In accordance with these and other objects which will be apparent hereinafter, the instant invention will now be described with particular reference to the accompanying drawings.

DESCRIPTION OF THE PREFERRED EMBODIMENT

Figures 1, 2, 3:
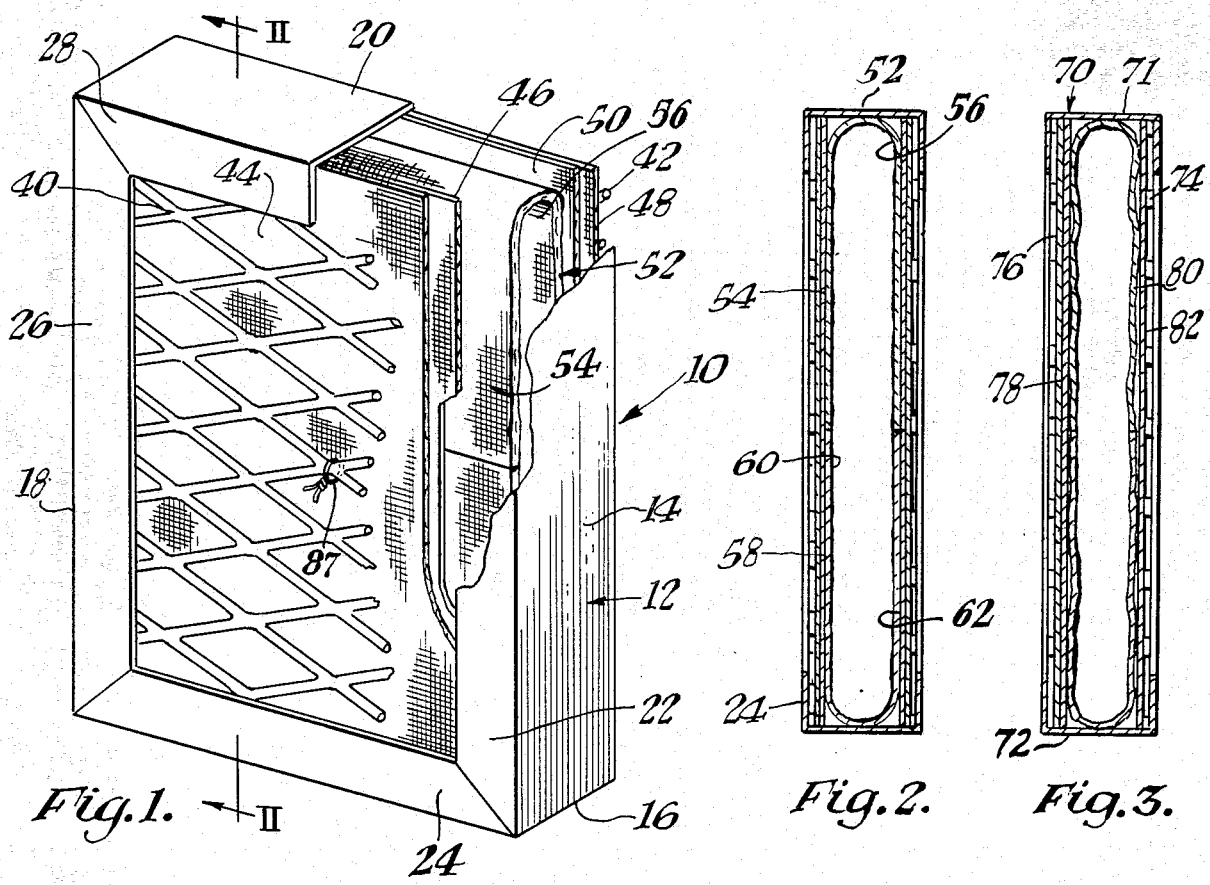
FIG. 1 is an isometric view of a filtering system partially cut away to show multiple stages of filtering including two folded three dimensional filter elements in a rigid frame.
FIG. 2 is a cross-sectional side view of FIG. 1 along line II—II looking in the direction of the arrows.
FIG. 3 is a partial cutaway cross-sectional view of another embodiment of the filter shown in FIG. 1 with only a single folded center three dimensional filter member.

Referring now to the drawings, a generally rectangular, thick permanent self-charging electrostatic air conditioning filter is shown in FIG. 1. The filter 10 is shown in a casing or frame 12 that is partially cut away. The frame 12 includes an aluminum casing generally 0.024 inches thick having four sides 14, 16, 18, and 20 respectively. Larger filters generally use 0.032 inch thick aluminum. The frame 12 has front flange members 22, 24, 26, and 28 respectively. The frame 12 has a rear flange members that are identical to the front flange. The flanges constrain the filter material in a predetermined usable shape. Metal grating 40 and 42 may be used at the front and rear of the system to support the filtering material from longitudinal movement due to the flow of gas through the various stages of filtering.

The forward grating member 40 holds the filter material system in place against the biasing force of the three dimensional thickness of filtering material. An identical aluminum grating member 42 is positioned on the rear face of the filter material system to provide an additional reactive force against the flow of gas therethrough. In large filters, the filter material may be secured to the grating member 40 by fastening means such as nylon tie-wraps 87 in FIG. 1. The filter material includes two overlying sheets 44 and 46 of fine mesh polypropylene in the form of a flat sheet. The sheets are preferably 12 mils in thickness to filter micron size particles. Two identical sheets 48 and 50 are preferably positioned adjacent the rear of the frame 12 in front of the grating 42. Between the two front sheets 44 and 46 and the two rear sheets lie a three dimensional layer of polypropylene 20 mil thickness material folded over on itself to form a generally U-shaped filtering stage with a gap therebetween. Each folded layer forms an envelope-like filtering stage without a crease thus providing an internal biasing means for holding overlying sheets 44, 46, 48 and 50 against their respective frame or grating. The two curved portions of the U-shaped filtering stage tend to straighten out into one plane, thus maintaining an air gap therebetween. The internal materials are a generally U-shaped form for maintaining a proper position of all filtering stages, thereby increasing the filtering efficiency of the system. Sheet 52 includes a forward portion 54 and a rearward portion 56. Sheet 58 includes a forward portion 60 and a rearward portion 62.

The frame 12 with filter elements 44, 46, 52, 48, and 50 may be constructed in various sizes to provide a structural filter system for different air handling ducts. Smaller installations may have a filter frame of aluminum of a smaller gauge without the grating members. The smaller systems of permanent self-charging electrostatic filter elements may be constructed as shown in FIG. 3. The filter system having a plurality of filter elements in a fixed arrangement and biased to maintain the positional arrangement, thereby increasing the efficiency of the filter system while maintaining the maximum flow of gas therethrough. The filter frame 70 in FIG. 3 has the same type and shape of flanges as frame 12 in FIG. 1. The flat metal is bent into the frame shape and the ends are secured together by riveting or the like. The upper frame member 71 and lower frame member 72 have flanges for holding in the filtering means without the front or rear grating members. The filter includes two flat sheets of thinner play (12 mils) filter material 76 and 78, a single sheet, of the thicker ply polypropylene material 80 of an open weave, the double layer formed by folding the single sheet in half without a crease whereby the two layers are biased outwardly away from each other and a single sheet 82 of the flat polypropylene material of thinner weave. Material 80 may be sandwiched between the two front sheets 76 and 78 and the single sheet 82.

Figures 4, 5, 6:
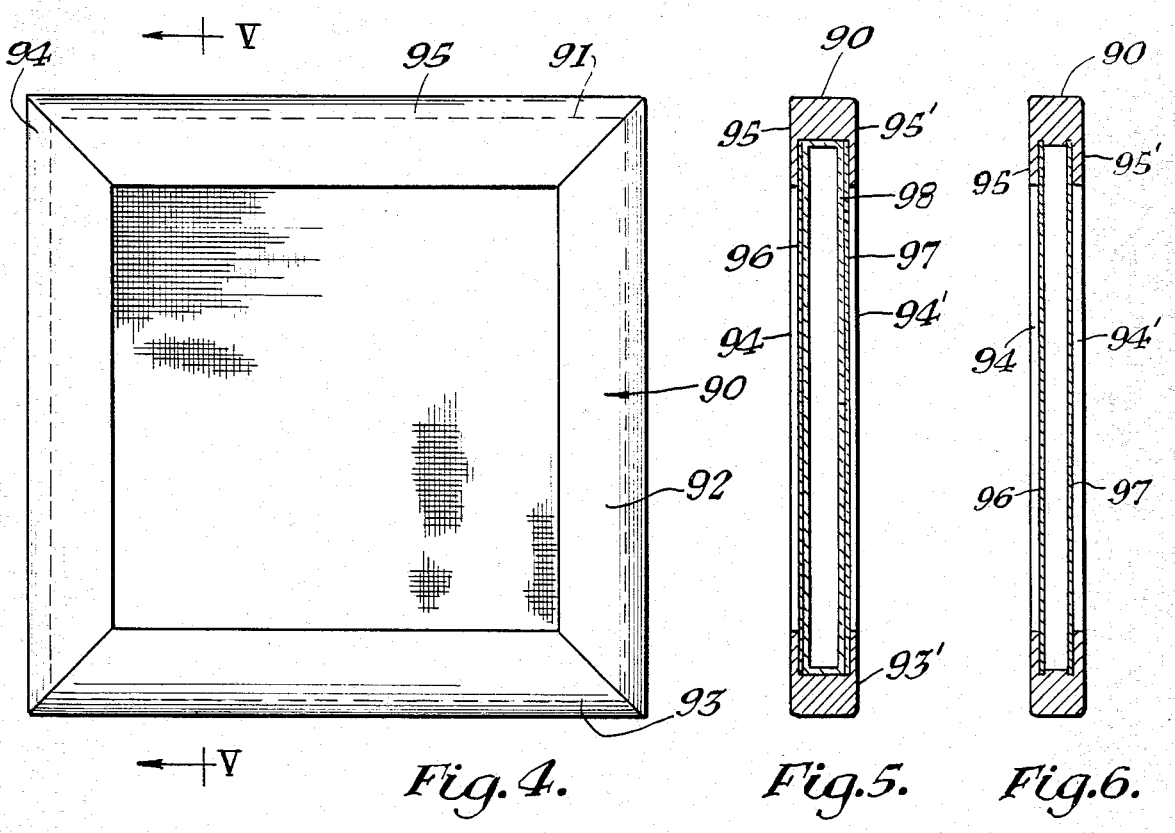
FIG. 4 is a front view partially cut away of a flexible filter system with at least one three dimensional filter element in a flexible synthetic frame.
FIG. 5 is a cross-sectional view of FIG. 4 taken along lines V—V and looking in the direction of the arrows showing a folded three dimensional filter element.
FIG. 6 is a partial cross-sectional view of another embodiment of the filtering system showing a three dimensional filtering element.

The following relatively thick inline air handling filter may be utilized without a metal frame as cleanable permanent self-charging electrostatic filter. This filter system shown in FIG. 4 includes a frame 90 that is a polypropylene sheet of material forming a border around the other filter material and sewn by monofilament stitches 91 around the flange or border portions 92, 93, 94, and 95. Like borders are on the back or rear side of the filter. FIG. 5 shows a cross-sectional view of the filter system taken along lines V—V and looking in the directions of the arrow. Similar flanges such as 93', 94', and 95' are shown in FIG. 5. A single forward sheet 96 of polypropylene material of open random weave is sewn into the filter system. A similar light sheet 97 is on the rear face of the filter. A thickened portion of polypropylene material 98 of different geometric weave makes up the center portion of the filter system. The center portion is unfolded and depends on the three dimensional characteristics of the center filter stage for biasing the filter system in fixed position to maintain the optimal filtering characteristics.

A grease filter may be constructed as shown in FIG. 6 by utilizing only two thicknesses of the permanent, self-charging electrostatic material 96, 97 as shown in the FIG. 5, and sewn together in the same type of border material without the thinner front and rear material sheets. This filter is identical to that shown in FIG. 5 except that the filtering system contains only a pair of three dimensional elements with different geometric openings to insure proper filtering action. A tie-wrap may be used as shown in FIG. 1 at 87 to support the filter elements.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A filter system for filtering unwanted particles from a gas stream comprising:
   at least three elements comprised of electrostatically self-charged filter material arranged in orderly adjacent successive stages for generating a self charge when gas flows through said at least three elements, said at least three elements including,
   a first filter element of random spaced polypropylene positioned as the furthest said stage from where said gas stream enters said filter system;
   a second filter element of random spaced polypropylene positioned as the closest stage where said gas stream enters said filter system;
   a third filter element of random spaced polypropylene position between said first filter element and said second filter element, said third filter element folded over on itself forming an air gap between adjacent surfaces for increasing filtering efficiency and, providing a means to bias said first filter element and said second filter element apart; and
   a generally U-shaped, non-corrosive edge side frame secured about the perimeter of said filter elements for maintaining said filter elements in axial alignment to the gas flow therethrough.

* * * * *